Nov. 2, 1954  V. N. MACKIW  2,693,404
METHOD OF SEPARATING METAL VALUES FROM AMMONIACAL SOLUTIONS
Filed Jan. 18, 1951  4 Sheets-Sheet 4

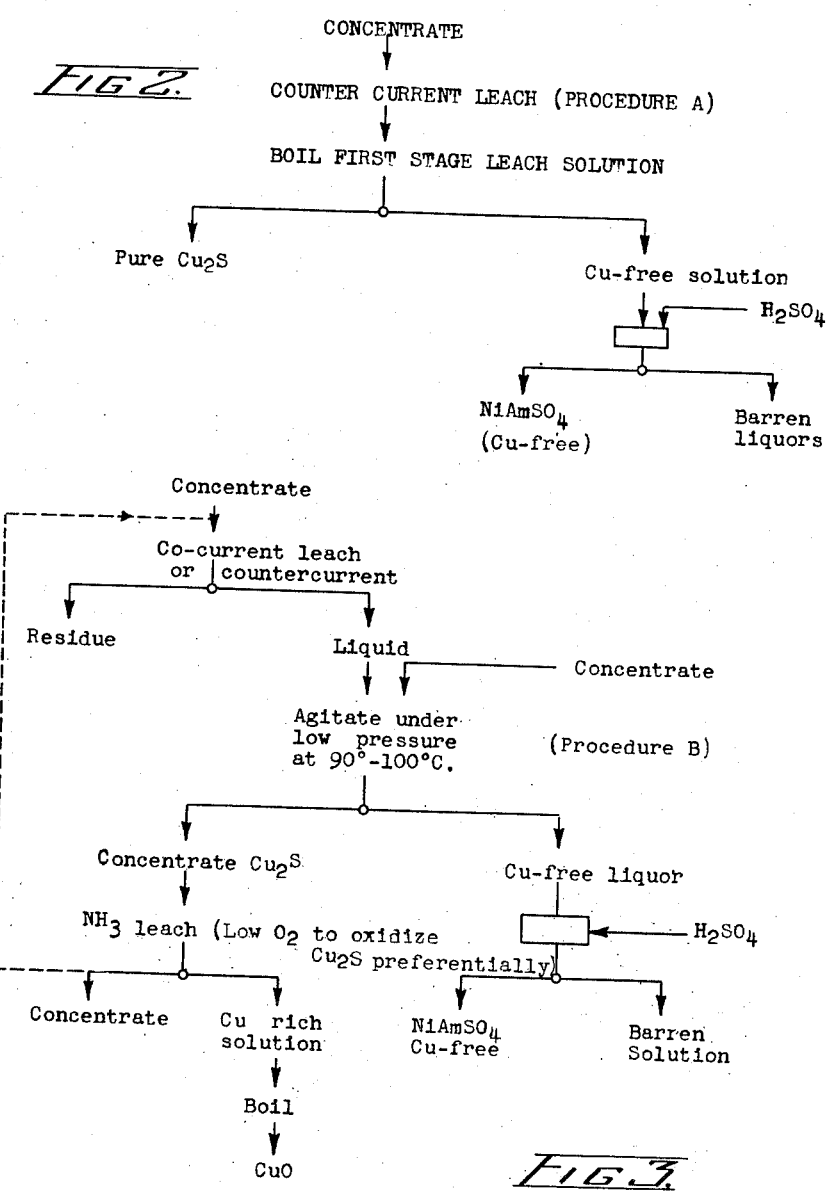

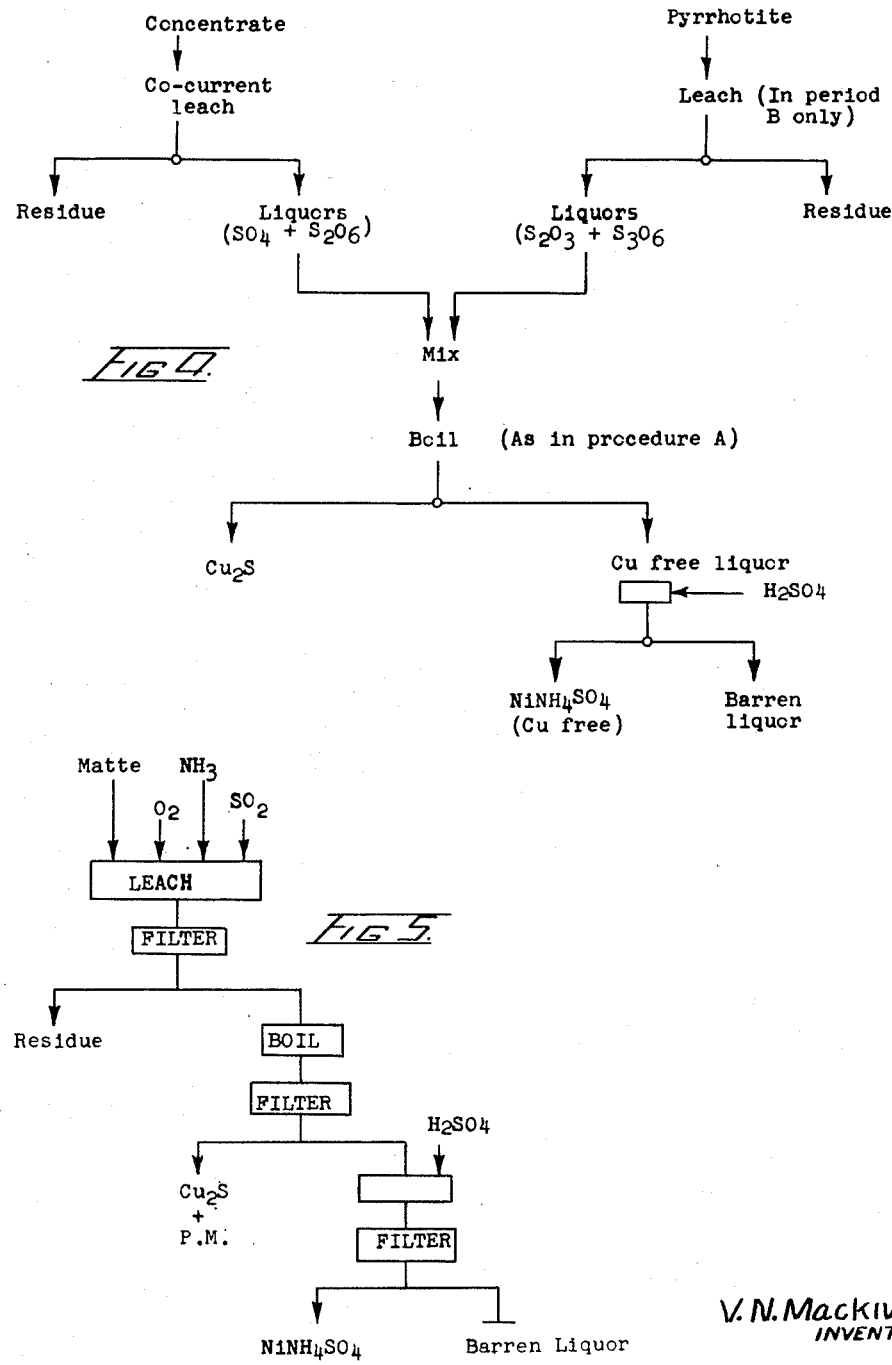

V. N. Mackiw
INVENTOR
PER
T. Harold Riches
ATTORNEY

United States Patent Office 2,693,404
Patented Nov. 2, 1954

2,693,404

METHOD OF SEPARATING METAL VALUES FROM AMMONIACAL SOLUTIONS

Vladimir N. Mackiw, Ottawa, Ontario, Canada, assignor to Sherritt Gordon Mines Limited, Toronto, Ontario, Canada, a corporation of Ontario Application January 18, 1951, Serial No. 206,612

11 Claims. (Cl. 23—117)

This invention relates to a process for the separation and recovery of copper, nickel, cobalt and other metal values associated therewith from nickeliferous and/or cobaltic sulphide ore, concentrates, matte and like nickel and/or cobalt bearing sulphide material.

Processes involving the leaching of nickeliferous oxide material with an ammonia-ammonium carbonate leach solution for the extraction of the nickel values thereof, and subsequent treatments of the resulting nickel solutions are relatively well known in the metallurgical art.

The ammonia-ammonium carbonate leaching processes of the prior art have the disadvantage that the nickel and other metals to be extracted from the starting ore or concentrate must be in reduced metallic form preparatory to the leaching step, and sulphide material must be subjected to preliminary oxidizing and reducing roasting operations to prepare it for leaching with an ammonia-ammonium carbonate leach solution. A further disadvantage is that the nickel content of the leach solution is very low, necessitating the use and subsequent treatment of large volumes of ammonia-ammonium carbonate leach solutions.

It has been found that nickel values of nickeliferous sulphide material, such as sulphide ores, concentrates and matte, may be successfully and economically extracted with a high degree of efficiency and without preliminary oxidizing and reducing operations by leaching the sulphide material directly with a strong aqueous ammonia solution substantially free from ammonium carbonate in the presence of an oxygen bearing, oxidizing gas such as air, compressed air, oxygen enriched air or oxygen alone or in combination with one or more other inert gases, the leaching being conducted under a superatmospheric pressure of at least the vapour pressure of ammonia and water vapour at the prevailing operating temperature. Under these conditions, nickel, copper, cobalt and precious metal values of the starting material are rapidly and efficiently put into solution from which they can be separately extracted in a highly purified condition.

A problem in the operation of this type of leaching process is encountered when other metal compounds are present which are soluble in the ammoniacal solution under the prevailing leaching conditions, such as copper sulphide, and other associated metals in the starting material. These metal values enter the leach solution with the nickel and cobalt and it is difficult to recover the nickel and cobalt values separately from the solution uncontaminated with these other metals.

An important object of this invention is to provide a method for the separation of the nickel and/or cobalt and other ammonia soluble metal values associated therewith from the leach solution resulting from leaching nickeliferous and/or cobaltic sulphide material with strong aqueous ammonia substantially free from ammonium carbonate. The leach solution is treated in a manner such that the metal values associated with the nickel and/or cobalt in the starting material are easily and quickly separated from the leach solution leaving the nickel and/or cobalt values in solution in a form in which they can be separated therefrom, and recovered in a highly purified condition substantially free from the metals with which they were associated in the starting material.

The invention involves separating from the leach solution those metal compounds associated with the nickel and/or cobalt in the starting material of which the sulphides are of lower solubility than nickel and/or cobalt sulphide, of which copper sulphide is a primary example, prior to the separation from the solution of the nickel and/or cobalt values, thus to enable the efficient separation of the nickel and/or cobalt values substantially free from contamination by other metals.

The method of separating and recovering values of a metal of the group consisting of nickel and cobalt in the presence of values of another metal, the sulphide of which is of lower solubility in ammoniacal solution than nickel sulphide comprises, in general, the steps of treating an ammoniacal solution containing, in solution, free ammonia, values of at least one of the metals nickel and cobalt, values of at least one other metal the sulphide of which is of lower solubility in ammoniacal solution than nickel sulphide, and at least one sulphur compound of the group consisting of polythionates having more than two sulphur atoms in their molecular structure and thiosulphate, heating the ammoniacal solution for a period of time sufficient to reduce the free ammonia content and convert values of said other metal to and precipitate them as metal sulphides, separating precipitated metal sulphides from the ammoniacal solution, and recovering values of at least one of the metals nickel and cobalt from the resultant solution.

An understanding of the manner in which the above and other objects of the invention may be attained may be had from the following description, reference being made to the accompanying drawing, in which:

Figures 2 through 6 are flow sheets illustrating modifications of the operation of the method.

Figure 1:
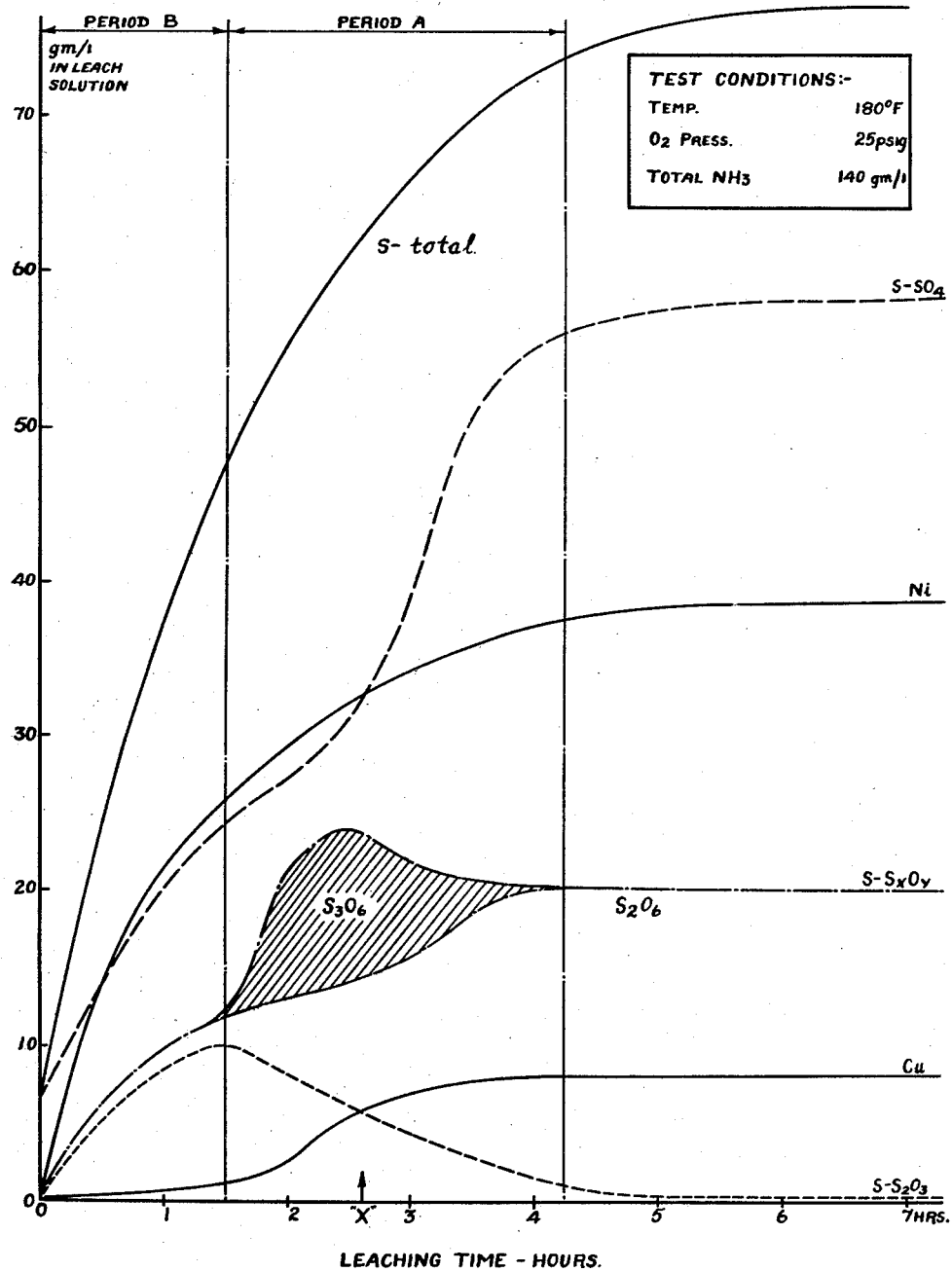
Figure 1 is a graph illustrating the progress of a leaching operation in which nickeliferous sulphide material is leached with strong aqueous ammonia under superatmospheric pressure in the presence of an oxygen bearing gas.

The ammoniacal leach solution containing the metal values may be derived from any one of several known leaching processes, for example, that process disclosed in co-pending application No. 58,644, filed November 6, 1948, now Patent No. 2,576,314, issued November 27, 1951, in which nickeliferous sulphide material is leached with strong aqueous ammonia substantially free from ammonium carbonate under superatmospheric pressure in the presence of an oxygen bearing, oxidizing gas. Alternatively, an acid solution containing the metal values as sulphates may be treated with ammonia to produce the ammoniacal leach solution.

Referring first to the treatment of a leach solution resulting from the leaching of nickeliferous and/or cobaltic sulphide material with strong aqueous ammonia substantially free from ammonium carbonate under superatmospheric pressure in the presence of oxygen bearing, oxidizing gas, the leach solution, if the leaching stage has been continued to the substantially complete extraction of the nickel values, will contain, in addition to the metal values, oxidized sulphur compounds, such as sulphate compounds, and ammonia compounds.

An important problem in the separation and recovery of a pure nickel or cobalt salt from the leach solution resides in the separation of the metals, such as copper, with which the nickel and/or cobalt are associated in the leach solution. It has been found, for example, that to ensure the production of a high purity nickel and/or cobalt salt from the leach solution, the copper and the metals associated therewith must be separated from the leach solution prior to the separation and recovery of the nickel values therefrom.

It has been found that when conditions described in detail hereinafter prevail in the leach solution, the metals such as copper whose sulphides are of lower solubility than that of nickel and/or cobalt sulphide can be easily and substantially completely precipitated from the leach solution, leaving the nickel and cobalt in the solution from which they can be recovered in a highly purified condition.

The term "associated metals" used herein indicates those metals other than nickel and cobalt which are usually present in nickeliferous and/or cobaltic sulphide ores and tend to precipitate from an ammoniacal solution under the conditions described in detail hereinafter. Examples of such metals are especially copper, and silver, gold, platinum, palladium and osmium. The essential characteristics of these associated metals is that their sulphides are of lower solubility than nickel sulphide.

Also, while dithionate ions may be unavoidably present in the leach solution, the term "polythionates" is intended to include all polythionates having more than 2 sulphur atoms in their molecular structure such as, for example, trithionate and tetrathionate.

The method of the present invention involves, in general, two principal steps, (a) the step of preparing an ammoniacal leach solution containing a compound of at least one of the metals nickel and cobalt and a compound of at least one associated metal to form in the solution, in addition to other sulphur-oxygen compounds, thiosulphate and polythionate ions; and (b) the step of treating the ammoniacal leach solution for a period of time sufficient to effect the precipitation as sulphides the metals associated with the nickel and cobalt in the solution separately from the nickel and cobalt values, after which the solution may be treated for the separate recovery of the nickel and/or cobalt values.

This method is effective for obtaining a substantially complete separation of the copper and other metals associated with the nickel and cobalt in the leach solution provided that sulphur in the form of sulphur-oxygen compounds, is present in the solution in excess of the stoichiometric ratio required for combination with the copper and nickel and associated metals present in the solution and that: (a) there are produced and present in the leach solution both thiosulphate ions and ions of polythionates having more than 2 sulphur atoms in their molecular structure, preferably there should be trithionate ions present, with subsequent breaking down of thiosulphate and polythionate ions; or (b) that there be contemporaneous formation and breaking down of thiosulphate and polythionate ions.

It has been found that these conditions can be produced in the case of: (a) by heating for a sufficient length of time the solution containing sufficient amounts of thiosulphate and polythionate ions; and in the case of (b) by adding one or more of the compounds ammonium thiosulphate, ammonium polythionates having more than 2 sulphur atoms in their molecular structure, or one or more of the group of sulphide minerals such as, for example, nickel flotation concentrates and pyrrhotite; or (c) by adding, prior to or during the leaching or metal extraction stage, one or more of the sulphide minerals such as nickel flotation concentrates and pyrrhotite, sulphur dioxide or other sulphur compound adapted to supply the sulphur for the formation of thiosulphate and polythionate ions, in the leach solution, and thereafter subject the leach solution to the treatment step described in detail hereinafter.

While the invention is independent of hypothetical considerations, the successful operation of the method appears to be influenced by the factors temperature, oxygen partial pressure, ammonia partial pressure, concentration of nickel and/or cobalt ions, concentration of copper and/or other associated metal ions, concentration of thiosulphate ions ($S_2O_3$), concentration of sulphate ions ($SO_4$), concentration of polythionate ions ($S_3O_6$ etc.), concentration of ammonium ions ($NH_4$), the length of time leaching has proceeded, and the amount of unleached nickel and/or cobalt and iron sulphides present.

The effect of these factors is illustrated in the accompanying graph, Figure 1, which illustrates the amounts in which the various ions and compounds are present at successive periods during the course of a typical batch leach in which a nickel-copper concentrate containing about 11% nickel and 2% copper was leached with about three times its weight of aqueous ammonia, about 14% $NH_3$. The leach was carried out at 180° F. with an oxygen partial pressure of about 25 pounds per square inch, the leach solution having a total ammonia content of about 140 grams per litre. In the course of the leach, two main reaction periods were observed designated on the graph as Period B and Period A.

*Period B*

Under the conditions obtaining in this particular leach, the initial "B" period was approximately 1½ hours. During this time there was present a large excess of sulphide material which, reacting with oxygen and ammonia caused the formation of sulphates, and thiosulphates according to the following reactions:

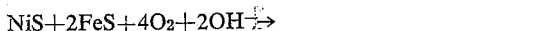
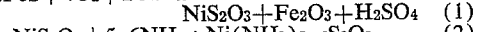
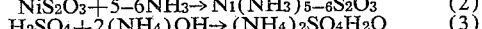

$$NiS + 2FeS + 4O_2 + 2OH^- \rightarrow$$
$$NiS_2O_3 + Fe_2O_3 + H_2SO_4 \quad (1)$$
$$NiS_2O_3 + 5-6NH_3 \rightarrow Ni(NH_3)_{5-6}S_2O_3 \quad (2)$$
$$H_2SO_4 + 2(NH_4)OH \rightarrow (NH_4)_2SO_4 H_2O \quad (3)$$

Oxidation of thiosulphate proceeds with the formation of thionates according to the equation:

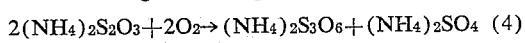

$$2(NH_4)_2S_2O_3 + 2O_2 \rightarrow (NH_4)_2S_3O_6 + (NH_4)_2SO_4 \quad (4)$$

As there is present, during this period, a large excess of sulphide material, the rate of formation of thiosulphates is faster than the rate of oxidation of thiosulphate to trithionates, and sulphate. The nickel in this phase readily forms a complex ammine and enters the solution in this form. The presence of excess sulphide not only tends to suppress solution of the copper sulphide minerals, but indeed tends to precipitate copper from the solution if it were present originally. It is considered that this tendency to precipitate copper as $Cu_2S$ results from the rapid transient formation of polythionate by decomposition of thiosulphate, according to Equations 4, 5 and 6, which, in turn, provides the sulphide ion necessary to precipitate $Cu_2S$. Advantage is taken of this phenomenon in Procedure B described below.

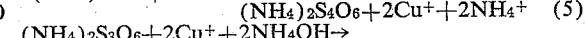

$$2(NH_4)S_2O_3 + Cu^{++} \rightarrow (NH_4)_2S_4O_6 + 2Cu^+ + 2NH_4^+ \quad (5)$$
$$(NH_4)_2S_3O_6 + 2Cu^+ + 2NH_4OH \rightarrow Cu_2S + 2(NH_4)_2SO_4 \quad (6)$$
$$2S_4O_6^{--} + 6OH^- \rightarrow 3S_2O_3^{--} + 2SO_3^{--} + 3H_2O \text{ etc.} \quad (7)$$

It is noted that in Period B the nickel dissolves rapidly, oxidized sulphur compounds such as sulphate sulphur compounds are produced at a similar rate, and all reactions appear to proceed in regular order except the dissolution of copper. All reactions during this period appear to be dominated by excess sulphides present.

*Period A*

A point is finally reached in the leaching stage at which the strong reducing action of the sulphides is overcome by the tendency of the oxygen bearing gas injected into the pressure vessel to react with the thiosulphate to produce polythionates. It might be said therefore that in Period A the reactions are dominated by oxygen.

At first the thiosulphate, being in high concentration, oxidizes according to the reaction 4. This results in a sharp increase in the amount of trithionates present, rising to a maximum as illustrated by the shaded area in Period A, Figure 1. During this period it is presumed that the formation of oxidized sulphur compounds is retarded only to be accelerated when the trithionate begins to decompose under the action of oxygen to form oxidized sulphur compounds such as sulphate according to the following reaction:

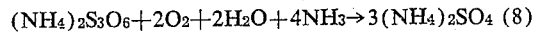

$$(NH_4)_2S_3O_6 + 2O_2 + 2H_2O + 4NH_3 \rightarrow 3(NH_4)_2SO_4 \quad (8)$$

It appears that the decomposition of trithionate causes a sharp rise in the curves which illustrates the formation of oxidized sulphur compounds. Also, during this Period A the copper sulphide minerals oxidize readily and dissolve as complex copper ammines.

Finally at the end of Period A there remains in the solution the following ions: nickel ammine (cobalt ammine); copper ammine (and ammines of associated metals); sulphate sulphur and possibly other oxidized sulphur compounds; dithionate sulphur; traces of thiosulphate sulphur; traces of trithionate sulphur; and ammonium ions.

The oxidized sulphur compounds are very stable and will not oxidize further under the conditions prevailing in the leach solution and the slight further change in solution composition that occurs between the 5th and 10th hours can be accounted for by the slower leaching, coarse particles of nickel-, copper-, and iron-sulphides that react in the now strongly oxidizing solutions to produce oxidized sulphur compounds practically instantaneously. The traces of thiosulphate at 7½ hours probably are derived from this final "asymptotic" leaching action.

By using a two-stage countercurrent leach, the leaching operation can be carried out continuously to produce solutions having any desired composition within the range shown in the graph by providing that the residence time in the first stage, to which fresh sulphides and recycle solution are added, shall be such that the elapsed leaching time lies at some suitable point such as "X" in Period A. The solids then being filtered off the leach liquor will have the composition corresponding with that time. These solids are leached with fresh ammonia for a long enough time that the liquor which is filtered from the final tails and which is recycled to the first stage has the character of the liquors shown at 7+ hours in the graph, that is, all sulphur is present as an oxidized sulphur compound such as present as $SO_4^=$.

It is pointed out that in a continuous 2-stage operation the sulphur content will not start at zero as shown in the graph but will start at some higher concentration. However, as the sulphur thus initially present is in a stable oxidized form, it does not enter into the sulphur-oxygen reactions while the new concentrate and the ammonia and oxygen present carry on through the cycle shown in the graph just as though the additional stable, oxidized compounds were not present.

The curves illustrated on the graph are derived by operating a leach under specific conditions of temperature, oxygen pressure, and ammonia concentration. Modification of any of these variables will change the slope and position of some or all of the curves as described hereinafter.

(a) *Temperature.*—Higher temperatures increase the rates of reaction and tend to increase the proportion of $S_2O_3^=$ and to decrease markedly the length of Period B when $S_2O_3^=$ exists. The peak concentration of $S_2O_3^=$ occurs at an earlier time and the duration of its existence is shorter.

(b) *Oxygen pressure.*—Lower oxygen pressure tends to increase the duration of $S_2O_3^=$ and to extend the period of existence of $S_3O_6^=$. The rate of dissolution of copper is lowered. Nickel dissolution rate is not greatly affected.

(c) *Ammonia concentration.*—Has no marked effect except that it must be high enough to prevent formation of basic salts and low enough at any pressure and temperature to prevent formation of insoluble copper- and nickel-amines.

(d) *Agitation.*—The most satisfactory leaching rate is obtained when the leaching operation is conducted with optimum agitation conditions.

It is found that this discovery may be employed to serve a useful purpose in two related but different ways, both of which have the same goal, namely separation of copper from nickel and cobalt in ammoniacal solutions. The two procedures are:

(a) Precipitation of nickel-free $Cu_2S$ from ammoniacal copper-nickel solutions containing thiosulphate and trithionate ions by boiling the solution at atmospheric pressure without access of air, and (b) Precipitation of $Cu_2S$ from ammoniacal copper-nickel solutions by agitating the solution in contact with sulphidic minerals as, for example, nickel-copper flotation concentrates and pyrrhotite at boiling temperature at atmospheric pressure or at a higher temperature under superatmospheric vapour pressure of water and ammonia.

*Procedure A*

The leach solution must have a composition lying within the range shown in Period A, Figure 1. That is, trithionate ions must be present and a mixture of thiosulphate and trithionate ions is usually present. Preferably, the composition, for the solutions used, should be about that at point "X" although there is a wide range of practical compositions. Preferably, however, the best results are obtained when the ratio of polythionates plus thiosulphate expressed as sulphur in grams per litre to copper in grams per litre are within the range of from about 0.8 to about 1.2. If such a solution is withdrawn from a batch leach or from the first stage of a 2-stage countercurrent leach and boiled, the first change to take place is the evaporation of free ammonia.

As the free ammonia decreases in the absence of air during boiling, the role of thiosulphate probably is to reduce the cupric ions to cuprous state. The $S_3O_6^{--}$ ions react with the cuprous ions to produce $Cu_2S$ which is insoluble and which then precipitates. $S_3O_6^{--}$ thus appears to be essential for $Cu_2S$ precipitation and can be employed to precipitate $Cu_2S$ from ammoniacal solutions if there is no free $O_2$ present in the solution.

The sulphide ions supplied from the decomposition of $S_3O_6$ react with copper and other associated metals only under the described conditions and do not produce nickel or cobalt sulphide thus giving a nickel-cobalt-free $Cu_2S$.

Hydrogen sulphide is not employed in the method of the present invention in that it would precipitate nickel-sulphide and/or cobalt in ammoniacal solution and thus defeat the purpose of the invention.

Good results are obtained by boiling the solution for from one to four hours while maintaining the original solution volume.

If a solution is to be produced containing thiosulphate and trithionate ions which, on boiling, will cause the copper to precipitate completely, the continuous leaching operation or a batch operation of suitable duration must be operated within certain limits. Otherwise, the thiosulphate formation, trithionate formation, etc. will not proceed in such a way that a suitable balance can be obtained. In the leach solution described, the limits appear to be:

|  | Min. | Max. |
|---|---|---|
| Range of Temperature | 150° F. / 65° C. | 185° F. / 85° C. |
| Range of oxygen partial pressure | 10 p. s. i. | 40 p. s. i. |
| Range of Total $NH_3$ Concentration | 135 g./l. | 170 g./l. |

*Procedure B*

A leach solution having any composition normally produced by 2-stage countercurrent leaching, or by co-current leaching when mixed with an iron sulphide mineral, and agitated under slight pressure with restricted oxygen pressure can be completely freed of copper. By this procedure, conditions resembling those in Period B are produced; the thiosulphate content of the leach solution rises rapidly and, at the elevated temperature, is practically instantaneously partially decomposed to produce $S_3O_6^{---}$ which, in turn, is decomposed rapidly to give $S^{--}$ ions, the presence of which retards solution of $Cu$ and favouring precipitation of $Cu_2S$.

Good results are obtained by agitating the leach solution with sulphide minerals such as copper-nickel-iron sulphide ores and flotation concentrates of the order of 25% solids or less at boiling temperature for about 20 minutes to 30 minutes. Copper can be completely eliminated as $Cu_2S$, being precipitated on the sulphide minerals.

It is found also that the $Cu_2S$ so precipitated can be easily redissolved in ammonia solution in the presence of oxygen in low concentrations and thus recovered from the solid residue.

In this procedure, complete $Cu_2S$ precipitation does not take place in the solutions described unless the operation is conducted within the following limits:

|  | Min. | Max. |
|---|---|---|
| Range of Temperature | Room Temp. | 100° C. (212° F.). |
| Range of oxygen partial pressure | 0 p. s. i. | 30 p. s. i. [1] |
| Range of Total $NH_3$ concentration | 90 g./l.[2] | 150 g./l.[2] |

[1] Operating at 30 p. s. i. very little, if any, agitation is required; otherwise the oxygen will oxidize the thiosulphate and polythionates to form oxidized sulphur compounds.
[2] Depending on the metal values in the solution.

The discovery of the progress of the reactions which take place in the leaching stage permits modification of the operation of the leaching and solution treatment stages to satisfy the requirements of the particular sulphide material being treated, thus to obtain the maximum benefits from the process. For example, if the sulphur content of the starting sulphide material is sufficiently high, as may be the case in the treatment of nickeliferous sulphide ore or concentrates, the material may be leached as described hereinbefore and the leach solution from the first leaching vessel boiled and the copper and other associated metal values precipitated in the leach solution, leaving the nickel and/or cobalt values of the leach solution substantially free from the metals with which they were earlier associated in the solution.

Alternatively, the leaching operation may be terminated during Period A and the leach solution separated and passed to the boiling stage. This procedure is ideally adapted for use in leaching in two or three countercurrent stages.

Alternatively, for materials deficient in sulphur, such as matte, sulphide mineral such as described above or an ammonia soluble sulphur compound such as sulphur dioxide may be added with the starting material charged into the leaching stage, or ammonium thiosulphate or ammonium polythionate may be charged into the leach solution after leaching and prior to the boiling stage to produce the conditions prevailing in Period A in Figure 1.

Several modifications of the operation of the process embodying these alternative procedures are described hereinafter and are illustrated in the flow sheet drawings.

Figure 2 illustrates the operation of the method in which the leach solution from the first stage of a multi-stage countercurrent leach is separated from the partially leached sulphide material by filtration. The partially leached solids are passed to the next succeeding leaching stage and are subjected to further leaching by strong aqueous ammonia solution advanced progressively towards the first leaching stage. The leach solution from the first leaching stage, high in thiosulphate and polythionate ion concentration, is boiled for a period of time sufficient to permit the precipitation of copper sulphide and the other associated metal values. These solid precipitates are separated from the leach solution leaving in the solution the nickel and cobalt values substantially free from impurities. The leach solution, after precipitation of the copper, may be treated with sulphuric acid to precipitate substantially pure nickel ammonium sulphate.

Figure 3 is a flow sheet illustrating a further modification in which the sulphides are leached in the manner described hereinabove and the leach solution, after separation of the solid, leached residue, is treated with a sulphide mineral, such as pyrrhotite. The mixture is heated for a period of time sufficient to precipitate the copper in the manner described above and filtered to separate the solid residue containing the precipitated copper and associated metal values from the leach solution leaving the nickel and cobalt values substantially free from impurities. The solid residue is then leached with ammonia with low oxygen pressure to oxidize and dissolve the copper which is separated from the solid residue. If the solid residue from this last leaching step contains metal values which may be extracted in the primary leaching stage, it may be returned to that stage as indicated by the dotted line.

A still further modification of the invention is illustrated by the flow sheet identified as Figure 4. The nickeliferous sulphide material is leached to substantial completion in the manner described hereinabove. Also, a sulphide mineral, such as pyrrhotite or nickel-copper flotation concentrates, is leached to produce a leach solution high in thiosulphate and polythionate ions. The two leach solutions are mixed and heated in the manner described hereinbefore for the precipitation from the solution of the copper and other metal values associated therewith.

The flow sheet illustrated by Figure 5 is addressed to a still further modification of the process in which sulphur dioxide or other suitable compound of sulphur is added to the charge to the leaching stage to supplement the thiosulphate and polythionate ion concentration of the leach solution in that stage to the extent that heating the leach solution is effective for precipitating the copper and associated metal values present.

Figure 6:
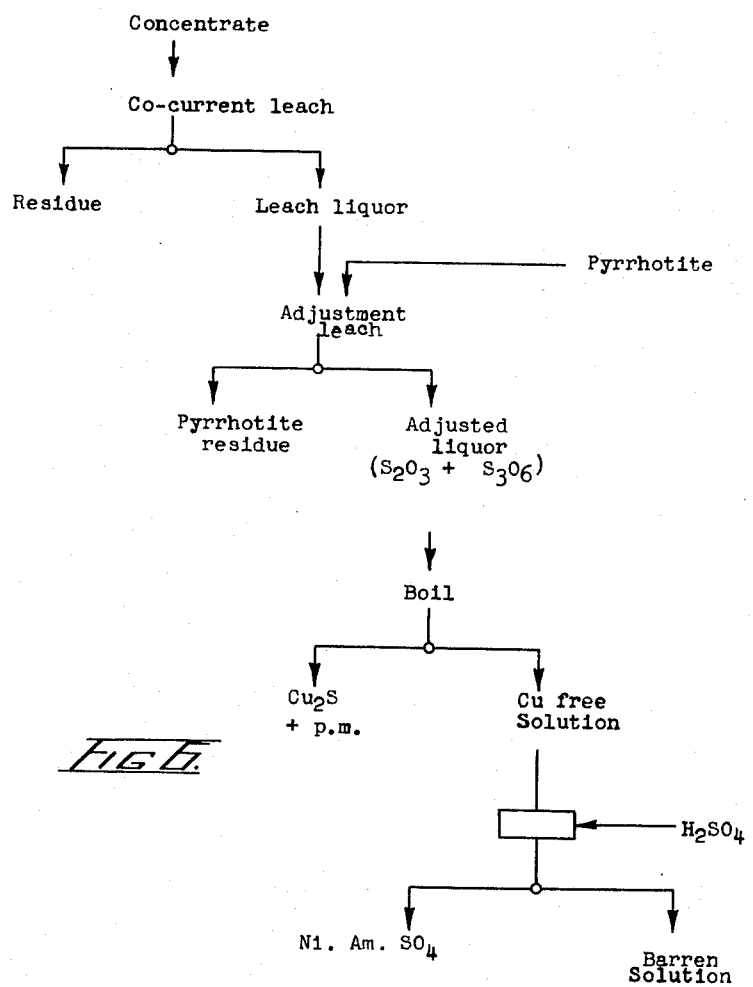

The flow sheet illustrated by Figure 6 is addressed to a further modification of the invention in which a mineral sulphide such as pyrrhotite is added to the solution from the leaching stage. The solution is then filtered and the filtrate is boiled to precipitate the copper sulphide which is separated by filtration. The residual solution containing the nickel and cobalt substantially free from impurities may then be treated for the recovery of the nickel and cobalt values.

The process of the present invention possesses a number of important advantages. The capital and operating costs are low as compared with the capital and operating costs of conventional pyrometallurgical processes. The nickel and cobalt and copper and other associated metal values are recovered in a condition which permits of inexpensive treatments for the production of metals substantially free from impurities. Also, of course, only a relatively small amount of metal values is locked in the process and in by-products as compared with conventional processes of the prior art.

The heating treatment is highly effective for precipitating the copper and associated metal values from the solution leaving the nickel and/or cobalt in solution substantially free from the impurities with which they were formerly associated and from which they may be separately recovered.

It will be understood that the term "essentially" used in the appended claims is intended to mean that a compound of at least one of the metals nickel and cobalt and a compound of at least one other metal the sulphide of which is of lower solubility than nickel sulphide are included in and form an essential part of the material being treated, although they may constitute only minor percentages of the material, and the material may contain greater or smaller percentages of other compounds.

It will be understood, of course, that modifications may be made in the preferred embodiments of the invention described and illustrated herein without departing from the scope of the invention defined by the appended claims.

What I desire to protect by Letters Patent of the United States is:

1. The method of treating sulphide material containing sulphides of at least one of the metals nickel and cobalt and sulphides of at least one other metal of lower solubility in ammoniacal solution than nickel sulphide, which method comprises the steps of leaching the material in pulverulent form with strong aqueous ammonia in a reaction zone maintained under superatmospheric pressure and at elevated temperature, agitating the mixture in the reaction zone, feeding an oxygen bearing, oxidizing gas into the agitated mixture during the leaching operation, continuing the leaching operation for a period of time sufficient to produce in the ammoniacal solution, in addition to dissolved metal values, free ammonia, and at least one sulphur compound of the group consisting of thiosulphate and polythionates, said polythionates having more than two sulphur atoms in their molecular structure, heating the ammoniacal solution for a period of time sufficient to reduce the free ammonia content and convert values of said other metal to and precipitate them as sulphides, recovering ammonia released during the heating step, separating precipitated metal sulphides from the ammoniacal solution, and recovering values of at least one of the metals nickel and cobalt from the resultant solution.

2. The method of treating a sulphide material containing sulphides of at least one of the metals nickel and cobalt and copper sulphide, which method comprises the steps of leaching the material in pulverulent form with strong aqueous ammonia in a reaction zone maintained under superatmospheric pressure and at elevated temperature, agitating the mixture in the reaction zone, feeding an oxygen bearing, oxidizing gas into the agitated mixture during the leaching operation, continuing the leaching operation for a period of time sufficient to produce in the ammoniacal solution, in addition to dissolved metal values, free ammonia, and at least one sulphur compound of the group consisting of thiosulphate and polythionates, said polythionates having more than two sulphur atoms in their molecular structure, heating the ammoniacal solution for a period of time sufficient to reduce the free ammonia content and convert dissolved copper values to and precipitate them as copper sulphides, separating precipitated copper sulphides from the ammoniacal solution, and recovering values of at least one of the metals nickel and cobalt from the resultant solution.

3. The method of treating a sulphide material containing sulphides of at least one of the metals nickel and cobalt and copper sulphide, which method comprises the steps of leaching the material in pulverulent form with strong aqueous ammonia in a reaction zone maintained under superatmospheric pressure and at elevated temperature, agitating the mixture in the reaction zone, feeding an oxygen bearing, oxidizing gas into the agitated mixture during the leaching operation, continuing the leaching operation for a period of time sufficient to produce in the ammoniacal solution, in addition to dissolved metal values, free ammonia and polythionates having more than two sulphur atoms in their molecular structure, heating the ammoniacal solution for a period of time sufficient to reduce the free ammonia content and convert dissolved copper values to copper sulphides, precipitating copper sulphides from the ammoniacal solution, separating copper sulphides from the solution, and recovering values of at least one of the metals nickel and cobalt from the resultant solution.

4. The method of treating a sulphide material containing values of at least one of the metals nickel and cobalt and values of at least one other metal the sulphide of which is of lower solubility in ammoniacal solution than nickel sulphide, which method comprises the steps of leaching the material in pulverulent form with strong aqueous ammonia in a reaction zone maintained under superatmospheric pressure and at elevated temperature, agitating the mixture in the reaction zone, feeding an oxygen bearing, oxidizing gas into the agitated mixture during the leaching operation, feeding sulphur dioxide gas into the agitated mixture during the leaching operation, continuing the leaching operation for a period of time sufficient to produce in the ammoniacal solution, in addition to dissolved metal values, free ammonia, and at least one sulphur compound selected from the group consisting of polythionates having more than two sulphur atoms in their molecular structure and thiosulphate, separating undissolved residue from the ammoniacal solution, heating the ammoniacal solution for a period of time sufficient to reduce the free ammonia content and convert values of said other metal to metal sulphides, recovering ammonia released during the heating step, separating metal sulphides from the ammoniacal solution, and recovering values of at least one of the metals nickel and cobalt from the resultant solution.

5. The method of separating and recovering values of a metal of the group consisting of nickel and cobalt in the presence of values of another metal the sulphide of which is of lower solubility in ammoniacal solution than nickel sulphide which comprises the steps of treating an ammoniacal solution containing, in solution, free ammonia, values of at least one of the metals nickel and cobalt, values of at least one other metal the sulphide of which is of lower solubility in ammoniacal solution than nickel sulphide, and at least one sulphur compound of the group consisting of polythionates having more than two sulphur atoms in their molecular structure and thiosulphate, heating the ammoniacal solution for a period of time sufficient to reduce the free ammonia content and convert values of said other metal to and precipitate them as metal sulphides, separating precipitated metal sulphides from the ammoniacal solution, and recovering values of at least one of the metals nickel and cobalt from the resultant solution.

6. The method of separating and recovering values of a metal of the group consisting of nickel and cobalt in the presence of values of another metal the sulphide of which is of lower solubility in ammoniacal solution than nickel sulphide which comprises treating an ammoniacal solution containing, in solution, free ammonia, values of at least one of the metals nickel and cobalt, values of at least one other metal the sulphide of which is of lower solubility in ammoniacal solution than nickel sulphide, and at least one sulphur compound of the group consisting of polythionates having more than two sulphur atoms in their molecular structure and thiosulphate, heating the ammoniacal solution for a period of time sufficient to reduce the free ammonia content and convert values of said other metal to and precipitate them as metal sulphides, recovering ammonia released during the heating step, separating precipitated metal sulphides from the ammoniacal solution, and recovering values of at least one of the metals nickel and cobalt from the resultant solution.

7. The method of separating and recovering values of a metal of the group consisting of nickel and cobalt in the presence of values of another metal the sulphide of which is of lower solubility in ammoniacal solution than nickel sulphide which comprises the steps of treating an ammoniacal solution containing, in solution, free ammonia, values of at least one of the metals nickel and cobalt and values of at least one other metal the sulphide of which is of lower solubility than nickel sulphide in ammoniacal solution, providing in the ammoniacal solution a compound of sulphur of the group consisting of thiosulphate and polythionates, said polythionates having more than two sulphur atoms in their molecular structure, in amount sufficient to combine with metal ions of said other metal values, heating the ammoniacal solution for a period of time sufficient to reduce the free ammonia content thereof by distillation and convert said other metal values to and precipitate them as metal sulphides, separating metal sulphides from the ammoniacal solution, and recovering values of at least one of the metals nickel and cobalt from the resultant solution.

8. The method for the separation and recovery of values of a metal of the group consisting of nickel and cobalt in the presence of values of copper which comprises the steps of treating an ammoniacal solution containing, in solution, free ammonia, values of at least one of the metals nickel and cobalt, copper values, and at least one sulphur compound of the group consisting of thiosulphate and polythionates, said polythionates having more than two sulphur atoms in their molecular structure, heating the ammoniacal solution for a period of time sufficient to reduce the free ammonia content thereof by distillation and convert values of copper to and precipitate them as copper sulphides, separating precipitated copper sulphides from the ammoniacal solution, and recovering values of at least one of the metals nickel and cobalt from the resultant solution.

9. The method for the separation and recovery of values of a metal of the group consisting of nickel and cobalt in the presence of values of copper which comprises the steps of treating an ammoniacal solution containing, in solution, free ammonia, values of at least one of the metals nickel and cobalt, copper values, and at least one sulphur compound of the group consisting of thiosulphate and polythionates, said polythionates having more than two sulphur atoms in their molecular structure, heating the ammoniacal solution for a period of time sufficient to reduce the free ammonia content thereof by distillation and convert copper values to and precipitate them as copper sulphides, recovering ammonia released during the heating step, separating precipitated copper sulphides from the ammoniacal solution, and recovering values of at least one of the metals nickel and cobalt from the resultant solution.

10. The method of separating and recovering values of a metal of the group consisting of nickel and cobalt in the presence of values of another metal the sulphide of which is of lower solubility in ammoniacal solution than nickel sulphide which comprises the steps of treating an ammoniacal solution containing, in solution, free ammonia, values of at least one of the metals nickel and cobalt and values of at least one other metal the sulphide of which is of lower solubility than nickel sulphide in ammoniacal solution to provide in the ammoniacal solution polythionates having more than two sulphur atoms in their molecular structure in amount sufficient to combine with metal ions of values of said other metal, boiling the ammoniacal solution for a period of time sufficient to reduce the free ammonia content thereof and convert values of said other metal to metal sulphides, precipitating said metal sulphides, separating precipitated metal sulphides from the ammoniacal solution, and recovering values of at least one of the metals nickel and cobalt from the resultant solution.

11. The method of separating and recovering values of a metal of the group consisting of nickel and cobalt in the presence of values of copper which comprises the steps of treating an ammoniacal solution containing, in solution, free ammonia, values of at least one of the metals nickel and cobalt, copper values, and polythionates having more than two sulphur atoms in their molecular structure, heating the ammoniacal solution for a period of time sufficient to reduce the free ammonia content and convert copper values to and precipitate them as copper sulphides, separating precipitated copper sulphides from the ammoniacal solution, and recovering values of at least one of the metals nickel and cobalt from the resultant solution.

(References on following page)

References Cited in the file of this patent

UNITED STATES PATENTS

| Number | Name | Date |
|---|---|---|
| 475,558 | Herrenschmidt | May 24, 1892 |
| 2,576,314 | Forward | Nov. 27, 1951 |

FOREIGN PATENTS

| Number | Country | Date |
|---|---|---|
| 122,479 | Hungary | Dec. 15, 1939 |
| 15,053 | Norway | May 6, 1904 |

OTHER REFERENCES

"A Comprehensive Treatise on Inorganic and Theoretical Chemistry" by Mellor, vol. 3, published by Longmans, Green and Co., 1923, page 221.